United States Patent Office 3,346,407
Patented Oct. 10, 1967

3,346,407
SOIL EROSION AND EVAPORATION CONTROL
James W. Van Leuven, Duarte, Calif., assignor to Aquatain Company, Incorporated, Pasadena, Calif., a corporation of California
No Drawing. Filed Apr. 27, 1964, Ser. No. 362,944
9 Claims. (Cl. 106—125)

ABSTRACT OF THE DISCLOSURE

A mixture of pectin, glycerine, citric acid, ammonia, silver nitrate, sawdust, glue and water for application to soil to prevent erosion and to control water evaporation.

Background of the invention

This invention relates to a mixture particularly useful for preventing soil erosion and evaporation and to the process for preparing a surface of the soil with such a mixture.

A very serious erosion problem exists on burned-off hill sides and some flat terrain. It is not unusual for a devastating fire to denude all vegetation from an area leaving little more than bare ground at the floor of the forest. Spring or fall rains have often formed a quagmire in such burned-off areas and mud slides frequently occur during such rains to present very serious problems which have not yet been solved in our times.

In many parts of the country it is necessary to rigidly schedule road building and grading in general in the dry seasons of the year because of the problems brought about by soil erosion. Fast growing grasses and ground covers must be planted almost immediately to prevent eroding of the bare earth.

I have discovered that gel producing substances such as pectin are sensitive to a number of elements including calcium and calcium bearing compounds which are commonly found in all soils throughout the world. Thus, by combining pectin which is water soluble, into a solution, it may be forced into the soil to form a series of plastic flakes which are loosely bonded to each other throughout the surface of the soil to thereby prevent the entry of extreme amounts of water into the soil and also inhibits the evaporation of the water from the soil.

One feature of my invention is directed to the use of granular cellulose filler material to extend a gel producing solution and also to inhibit run-off of the solution while it is being applied to the soil.

While pectin is known for its gelling properties and used by many housewives in household canning, it is quite sensitive and an aqueous solution could be accidentally gelled by a number of things. For instance, the pH of household water varies from 6.8 to 9.0 throughout the country, and I have found that if the water is too alkaline or too acid in nature, that a gel readily forms. The temperature of a pectin solution also affects the rate of gelation.

In broad terms, my invention comprises an aqueous mixture of a gel forming material in which an insoluble filler is suspended. The invention extends to an aqueous mixture of pectin, a buffer, a preservative, and an insoluble filler. Another form of my invention comprises an aqueous mixture of pectin, a buffer, a preservative, an insoluble filler a fermentation preventative, and a wetting agent.

In terms of a process, my invention includes the steps of wetting a plot of soil with water to a depth of at least 3 inches, mixing an aqueous mixture having a pectin and a granular filler, spraying the compound upon the soil whereby gel flakes are formed by the reaction of the compound and the soil with the gel flakes loosely connected to each other.

The term "pectin" as used in this specification refers to those materials in fruits which form colloidal solutions in water and are derived from pectose (protopectin) by ripening processes or other forms of hydrolysis. A wide range of combinations of constituents of pectin is possible and it is reasonable to assume that there are a number of different pectins in nature, since pectins from different fruits and vegetables vary considerably, not only in its chemical composition but also in its physical properties, degree of polymerization, and esterification. Pectin is a reversible colloid; i.e., it may be dissolved in water, precipitated, dried, and redissolved without alteration of its physical properties. One method of producing pectin is given in detail in the patent to Taylor et al., 1,497,884. As used in this specification, all known methods of producing pectin and all forms of pectin are included including those forms which are found in nature and any which may be formed synthetically by using its organic chemical structure.

The term "buffer solution" as used in this specification relates to any of the solutions to which moderate amounts of either a strong acid or base may be added without causing any large change in pH value of the solution. Such solutions may include a weak acid and a salt of the weak acid, a mixture of an acid salt with the normal salt, or a mixture of two acid salts.

The term "preservative" as used in this specification refers to materials which tend to keep gel flakes from drying out after being formed. Glycerin has been found to be an excellent water absorbing material and may serve as a preservative. However, other materials may also be used to serve this function.

The term "fermentation preventative" as used in this specification refers to those materials which prevent the break down of complex molecules in compounds.

The term "filler" as used in this specification refers to materials which are preferably insoluble and act as an adulterant that increases the bulk of the material.

The term "wetting agent" as used in this specification refers to materials that reduce surface tension.

A soil erosion deterrent solution according to my invention is preferably composed of about 1.0% pectin, 6.5% glycerin, 0.5% citric acid, 0.4% ammonia, 0.002% silver nitrate, 10% sawdust, 0.25% glue, and the remainder by weight is water to reach a total of 100%. Without destroying the basic value of this erosion deterrent solution, the quantity of some ingredients may be changed by varying the composition with the following approximate ranges:

| Ingredient: | Percentage by weight |
|---|---|
| Pectin | .01 to 1.25 |
| Glycerin | 5.0 to 8.5 |
| Citric acid | .4 to .6 |
| Ammonia | .3 to .5 |
| Silver nitrate | 0.002 |
| Sawdust | 5.0 to 15 |
| Glue | 0.12 to 0.25 |
| Water | Remainder |

The pectin, glycerin, citric acid, ammonia, and silver nitrate are all mixed together to form an intimate mixture. Thereafter, the water is added to form the aqueous solution. This procedure must be followed since it is possible to cause the pectin to gel immediately if the water is lower or higher than 7.2 to 8.0 pH.

The above example is a concentrate and used only as a mixture diluted with water in a ratio of one part concentrate to ten parts water by weight and in some cases is used in more diluted mixtures blended in a ratio of 1:20 by weight.

The purpose of the glycerin is to absorb water and in this way helps tend to keep the plastic-like flakes, formed by gelled pectin, in a moisturized condition for an extended period of time. Conversely without a substance like glycerin, the plastic-like flakes will harden more rapidly and tend to lose some water shedding properties and hence lose some of its commercial value within the soil. Other water holding materials such as certain soaps and the like may be substituted. However, problems of sudsing and foaming have led me to use glycerin exclusively in the most preferred embodiment of my invention.

Citric acid and ammonia are used together as a buffer solution in the most preferred ambodiment of my invention. Those skilled in the art may substitute other well known buffer solutions and still practice my invention with the same facility. It is conceivable that the buffer solution may be completely eliminated if the pH value of the water used in practicing my invention is kept within limits. For instance, if distilled water having a pH value of 7.0 is used, the buffer solution may be eliminated. Also, if the water has a pH ranging from 7.2 to 8.0, the buffer solution can be eliminated, or if used it has little effect. Thus, it is apparent that the buffer solution allows a great variation in pH value varying from 6.8 to 9.0 which covers the gamut of all known municipal water in the United States. Variations in pH in the water used in practicing my invention will allow the pectin to accidentally gel before it is applied to the soil. Since my invention may be used by individuals who do not understand pH factors or who do not have testing apparatus to determine the exact pH of the water at a particular low calorie, it is preferred to use a buffer solution to compensate for any variation in pH either above or below the critical 7.2 to 8.0 value.

Silver nitrate is used to prevent fermentation of the aqueous solution and other fermentation compounds may be used with equally good results. These other compounds are apparent to those skilled in the art and may be substituted for silver nitrate.

The sawdust acts as a filler material and serves to extend the coverage of the aqueous solution compounded according to the present invention. The sawdust tends to retain moisture, thus also helps to keep the plastic-like flakes, formed upon gelling of the pectin, in a moisturized condition. The sawdust may be colored, for instance it may be dyed green by food coloring or other known colorants to help identify those areas which have been covered as it is applied to the soil. This sawdust tends to lock the gelled pectin within the soil and thus tends to prevent run-off of the plastic flakes as they are formed, especially in those areas where the hill sides are covered in a manner as prescribed by my invention. The sawdust may be substituted by materials such as any granular cellulose all of which help retain moisture and which would serve the same purpose as the sawdust. Other materials such as open cell plastic foams and the like would also serve the same purpose and may be substituted.

The glue is used as a wetting agent as it tends to aid the absorption of the solution into the sawdust or other filler material. Other acceptable wetting agents include sugar solutions made from 20% sugar by weight and 80% water by weight. Any wetting agent commercially available may be substituted for the glue and still obtain acceptable results.

In practicing my invention, it is preferred that the solution set forth in the above example is diluted in a proportion of 10:1, i.e., one part of pectin solution to ten parts of water and thoroughly mixed. This solution then is thin enough to be spread in commercial sprayers and also may be deployed in a manner which is best dictated by the terrain being prepared. For instance, the solution may be deployed from tanker aircraft in much the same manner as boron solutions are deployed when fighting fires.

A description of the method in terms of deploying an aqueous solution according to the present invention will demonstrate the simplicity with which a soil erosion deterrent solution may be applied. The aqueous solution as set forth in the above example is mixed in a quantity dictated by the area to be covered and then diluted preferably at the ratio of 10:1 when the deploying means is a spraying device. The diluted solution is sprayed or forced into the upper ¼" to ½" of the soil. The contact of the pectin in the solution with the natural calcium and calcium containing compounds in the soil causes layers of plastic-like flakes to form. These flakes have a size of a ⅛" diameter varying up to the size of a person's fingernail with all the flakes loosely attached one to another. The number of flakes will depend in each instance upon the amount of pectin in the solution and the preferred amount of pectin has been found to be 1% by weight as set forth in the preferred example. Within four hours, all the flakes are formed and the gel dries to its plastic consistency. The flakes are loosely attached one to another and allow water to pass through by gravity but yet the flakes impede the evaporation of moisture from the soil. The flakes also form around the sawdust which is present both on the surface and beneath the surface of the soil which tends to lock together into a cohesive mass to form a layer of particles which inhibit erosion.

In practicing my invention, the soil erosion control mixture as set forth in the above example may be used for erosion control on newly planted areas including slopes up to 30°. It is preferable that the area to be treated is thoroughly wet with water to a depth of not less than 3". Grass seed may be sown or ground cover planted at this time before the soil is treated in accordance with my invention. It is preferred that little or no top dressing be added to the soil since it is possible that the dressing could interfere with the proper treatment of the soil. Using the solution set forth in the above example, one part of the solution is added to ten parts of water and is preferably mixed in an agitator-type tank although this type of agitation is not required. It is imperative that the water is not added to the solution since we have found that accidental gelling could occur. The diluted mixture compounded in accordance with my invention is sprayed on an area of 400–500 square feet for each ten gallons of diluted solution. The plastic gel flakes will form within four to six hours and during this forming period the area should not be watered. After the gel flakes have formed, the process of gelling is irreversible and will not go back into solution even with excessive watering. No further treatment is required to control the area from erosion of both wind and water.

In areas which have established turf, ground cover, or other vegetation, it is often desirable to prevent evaporation of water which is in the soil. The area to be treated is thoroughly wet down to a depth of at least 3". Using a conventional blower-type spray mist or a hose and garden sprayer, the solution set forth in the above example is diluted by the garden hose spray in a ratio of approximately 20:1. This type of distribution is required since it is possible to gel the solution within a mixing tank after attempting to premix a diluted solution at the ratio of 20:1. Within four to six hours after application of the diluted solution, the solution will form plastic flakes which are irreversible. We have found that under average climatic conditions, watering of such a treated area is normally reduced by ⅓ by the inherent evaporation suppression by the plastic flakes.

What is claimed is:

1. A soil erosion and evaporation deterrent comprising by weight:

an aqueous solution having a pH in the range of 7.2 to 8.0 of from about .01% to about 1.25% pectin by weight, and from about 1% to about 10% filler material by weight, and the remainder being water.

2. A soil erosion and evaporation deterrent comprising by weight a solution having a pH in the range of 7.2 to 8.0 of:
.01% to 1.25% pectin,
.01% to 1.0% buffer,
1% to 10% filler material, and
the remainder being water.

3. A soil erosion and evaporation deterrent comprising by weight a solution having a pH in the range of 7.2 to 8.0 of:
.01% to 1.25% pectin,
.01% to 1.0% buffer,
.002% fermentation preventative,
1% to 10% cellulose, and
the remainder being water.

4. A soil erosion and evaporation deterrent comprising by weight a solution having a pH in the range of 7.2 to 8.0 of:
.01% to 1.25% pectin,
.01% to 1.0% buffer,
.002% silver nitrate,
1% to 10% cellulose, and
the remainder being water.

5. A soil erosion and evaporation deterrent comprising by weight a solution having a pH in the range of 7.2 to 8.0 of:
.01% to 1.25% pectin,
5.0% to 8.5% glycerin,
.01% to 1.0% buffer,
.002% fermentation preventative,
1% to 10% sawdust, and
with the remainder being water.

6. A soil erosion and evaporation deterrent comprising by weight:
.01% to 1.25% pectin,
5.0% to 8.5% glycerin,
.4% to .6% citric acid,
.3% to .5% ammonia,
.002% silver nitrate,
1.0% to 10% sawdust, and
the remainder is water.

7. A soil erosion and evaporation deterrent comprising by weight a solution having a pH in the range of 7.2 to 8.0 of:
.01% to 1.25% pectin,
.01% to 1.0% buffer solution,
.002% fermentation preventative,
1.0% to 10% cellulose,
.12% to .25% wetting agent, and
the remainder is water.

8. A soil erosion and evaporation deterrent comprising by weight:
1.0% pectin,
6.5% glycerin,
.5% citric acid,
.4% ammonia,
.002% silver nitrate,
5.0% to 15% sawdust, and
the remainder is water.

9. A soil erosion and evaporation deterrent comprising by weight:
1.0% pectin,
6.5% glycerin,
0.5% citric acid,
0.4% ammonia,
0.002% silver nitrate,
10% sawdust,
0.25% glue, and
the remainder is water.

References Cited

UNITED STATES PATENTS 1,973,613 9/1934 Cowgill _____ 106—208
2,661,297 12/1953 Walsh et al.

FOREIGN PATENTS 32,035 12/1946 India.

OTHER REFERENCES

Z. I. Kertesz, "The Pectic Substances," 1951 (pp. 140 and 164–167).

ALEXANDER H. BRODMERKEL, *Primary Examiner.*

T. MORRIS, *Assistant Examiner.*